US011320509B2

(12) United States Patent
Ertan et al.

(10) Patent No.: US 11,320,509 B2
(45) Date of Patent: May 3, 2022

(54) ELECTRONIC DEVICES WITH MOTION SENSING AND ANGLE OF ARRIVAL DETECTION CIRCUITRY

(71) Applicant: Apple Inc., Cupertino, CA (US)

(72) Inventors: Tunc Ertan, Cupertino, CA (US); Brent M. Ledvina, San Francisco, CA (US); Robert W. Brumley, Menlo Park, CA (US); Adam S. Meyer, Cupertino, CA (US); Peter C. Tsoi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 16/382,120

(22) Filed: Apr. 11, 2019

(65) Prior Publication Data

US 2019/0317177 A1    Oct. 17, 2019

Related U.S. Application Data

(60) Provisional application No. 62/658,738, filed on Apr. 17, 2018.

(51) Int. Cl.
*G01S 3/48* (2006.01)
*G01S 3/04* (2006.01)

(52) U.S. Cl.
CPC .............. *G01S 3/48* (2013.01); *G01S 3/043* (2013.01)

(58) Field of Classification Search
CPC ..................................... G01S 3/48; G01S 3/43

(Continued)

(56) References Cited

U.S. PATENT DOCUMENTS 7,880,684 B2    2/2011  Schantz
8,249,626 B2    8/2012  Huston
(Continued)

FOREIGN PATENT DOCUMENTS

EP      2854463 A1    4/2015
WO   2016061804 A1    4/2016

OTHER PUBLICATIONS

Fuentes-Pacheco, Jorge, et al., "Visual simultaneous localization and mapping: a survey", Spring Science + Business B.V., Dec. 2012, [Retrieved on Sep. 9, 2016], Retrieved from the Internet: <URL: https://www.researchgate.net/publication/234081012>.

(Continued)

*Primary Examiner* — Bo Fan
(74) *Attorney, Agent, or Firm* — Treyz Law Group, P.C.; Kendall P. Woodruff

(57) ABSTRACT

An electronic device may use information about the location of nearby devices to make sharing with those devices more intuitive for a user. The electronic device may include control circuitry, wireless circuitry including first and second antennas, and motion sensor circuitry. The control circuitry may determine the location of a nearby electronic device by calculating the angle of arrival of signals that are transmitted by the nearby electronic device. To obtain a complete, unambiguous angle of arrival solution, the electronic device may be moved into different positions during angle of arrival measurement operations. At each position, the control circuitry may calculate a phase difference associated with the received signals. Motion sensor circuitry may gather motion data as the electronic device is moved into the different positions. The control circuitry may use the received antenna signals and the motion data to determine the complete angle of arrival solution.

21 Claims, 12 Drawing Sheets

(58) Field of Classification Search
USPC .................................................. 342/442, 146
See application file for complete search history.

(56) References Cited

U.S. PATENT DOCUMENTS

| | | | |
|---|---|---|---|
| 8,661,352 | B2 | 2/2014 | Gronow et al. |
| 8,842,003 | B2 | 9/2014 | Huston |
| 9,055,162 | B2 | 6/2015 | Park et al. |
| 9,232,353 | B2 | 1/2016 | Bozarth et al. |
| 9,600,584 | B2 | 3/2017 | Schloter |
| 2008/0039212 | A1 | 2/2008 | Ahlgren |
| 2008/0100502 | A1* | 5/2008 | Jantunen .................. G01S 3/74 342/146 |
| 2012/0258669 | A1 | 10/2012 | Honkanen |
| 2013/0225078 | A1 | 8/2013 | Johansson |
| 2015/0236922 | A1 | 8/2015 | Xiong |
| 2015/0279081 | A1 | 10/2015 | Monk et al. |
| 2015/0373091 | A1 | 12/2015 | Sanghavi |
| 2016/0112839 | A1 | 4/2016 | Choi |
| 2016/0327926 | A1* | 11/2016 | Shi ......................... G05B 15/02 |
| 2016/0360343 | A1 | 12/2016 | Shi |
| 2016/0360344 | A1 | 12/2016 | Shim |
| 2016/0370450 | A1* | 12/2016 | Thorn ....................... G01S 3/46 |

OTHER PUBLICATIONS

"Introduction To Real Time Location Systems", DecaWave, Application Note: APS003,2014. p. 1-14, Dublin, Ireland.
"Sevenhugs Smart Remote: The Remote for Everything", Indiegogo, 25 pages, [Retrieved on Sep. 5, 2017], Retrieved from the Internet: <URL:https://www.indiegogo.com/projects/sevenhugs-smart-remote-the-remote>.
"Ultra-Wideband Location", NIST, Dec. 15, 2009, 3 pages, [Retrieved on Sep. 5, 2017], Retrieved from the Internet: <URL: https://www.nist.gov/programs-projects/ultra-wideband-location>.

* cited by examiner

ELECTRONIC DEVICES WITH MOTION SENSING AND ANGLE OF ARRIVAL DETECTION CIRCUITRY

This application claims the benefit of provisional patent application No. 62/658,738, filed Apr. 17, 2018, which is hereby incorporated by reference herein in its entirety.

FIELD

This relates generally to electronic devices and, more particularly, to wireless electronic devices that are used to communicate with other wireless electronic devices.

BACKGROUND

Electronic devices often include wireless communications circuitry. For example, cellular telephones, computers, and other devices often contain antennas and wireless transceivers for supporting wireless communications.

Wireless electronic devices often communicate with other nearby wireless electronic devices. For example, a user may wirelessly share files with another nearby user over a short-range communications link such as Bluetooth® or WiFi®.

Sharing information wirelessly with nearby electronic devices can be cumbersome for a user. The user may not know when the device of another user is sufficiently close to establish a short-range wireless communications link. There may be multiple devices within range, making it challenging to safely and easily establish a communications link with the desired device. For example, when a user is in a public environment with a large number of unfamiliar devices, the user may have difficulty finding and selecting the desired device with which he or she desires to communicate wirelessly.

Antennas are sometimes used to determine the location of other electronic devices, but the antennas in conventional electronic devices do not provide sufficient information to determine the location of other electronic devices without ambiguity.

SUMMARY

An electronic device may be provided with wireless circuitry. The wireless circuitry may include one or more antennas. The antennas may be configured to receive IEEE 802.15.4 ultra-wideband communications signals and/or millimeter wave signals. The antennas may also include wireless local area network antennas, satellite navigation system antennas, cellular telephone antennas, and other antennas.

The electronic device may be provided with control circuitry and a display. The control circuitry may determine where nearby electronic devices are located relative to the electronic device. The display may produce images that indicate where the nearby device is located. The control circuitry may determine when the electronic device is oriented in a particular way relative to a nearby device. In response to determining that the electronic device is arranged end-to-end or side-to-side with another device, for example, the control circuitry may use wireless transceiver circuitry to automatically exchange information with the electronic device or may automatically prompt the user to indicate whether the user would like to exchange information with the electronic device.

The control circuitry may determine the location of a nearby electronic device by calculating the angle of arrival of signals that are transmitted by the nearby electronic device. To obtain a complete, unambiguous angle of arrival solution, the electronic device may be moved into different positions during angle of arrival measurement operations. At each position, the control circuitry may calculate a phase difference associated with the received signals. Motion sensor circuitry may gather motion data as the electronic device is moved into the different positions. The control circuitry may use the received antenna signals and the motion data to determine the complete angle of arrival solution.

DETAILED DESCRIPTION

In some wireless systems, the services that are provided may depend on the position of one wireless communications device relative to another wireless communications device. For example, consider a scenario in which a user of a first wireless device wishes to share information with a user of a second wireless device. When the two devices are within an appropriate range of one another, a short-range communications link may be established and information may be exchanged over the communications link.

In this type of scenario, it may be desirable for a user to not only know when a wireless communications link has been established, but also to easily control which device the user exchanges information with. For example, in a crowded room where multiple wireless communications devices are close enough to establish a communications link, it may be desirable for the user to be better informed of which devices are near the user, where the devices are located relative to the user, and whether and with whom a communications link has been established. It may also be desirable for the user to have better and more intuitive control over which device the user shares information with, what information is shared, and when the information is communicated between the two devices.

Figure 1:
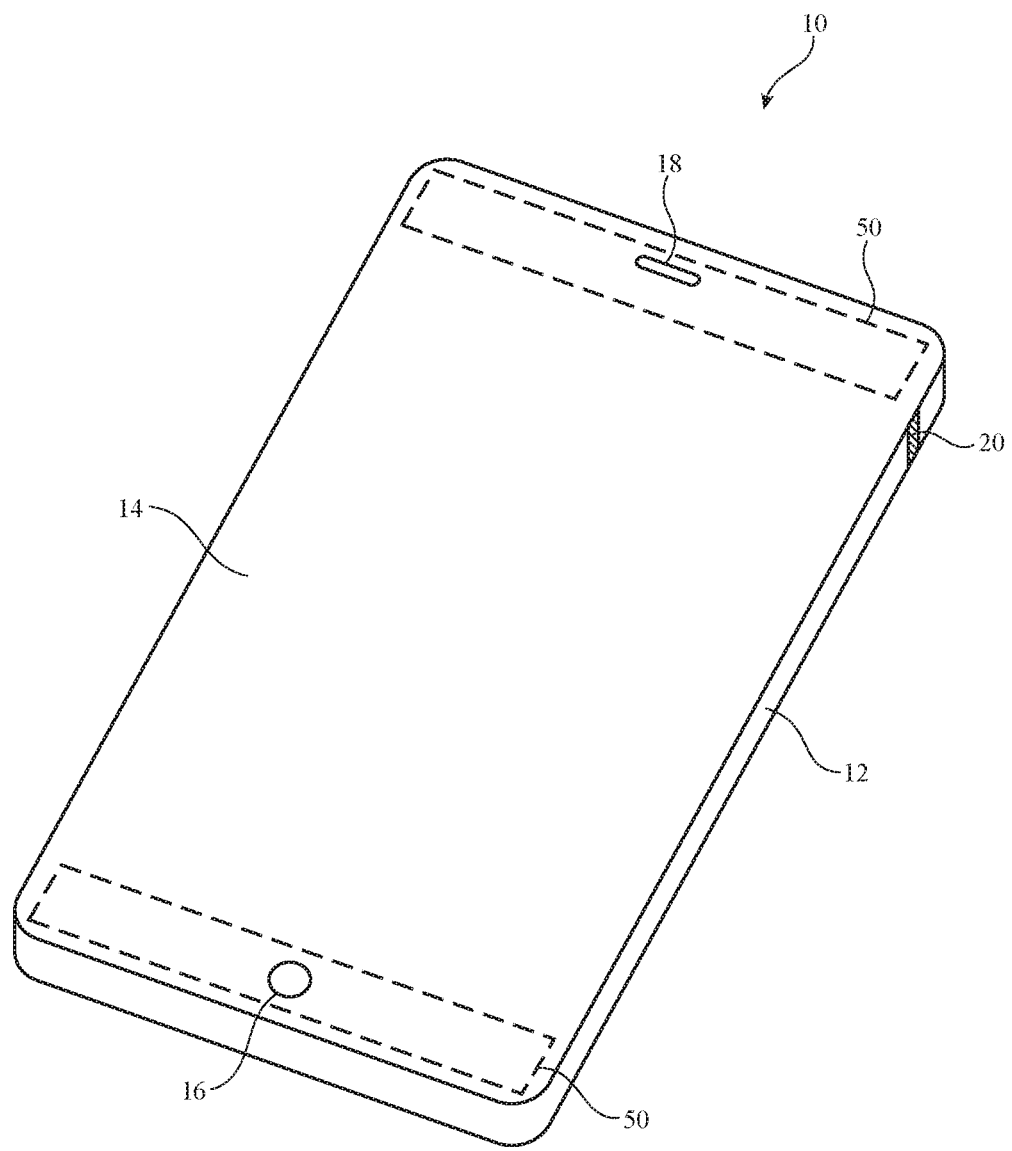
FIG. 1 is a perspective view of an illustrative electronic device with wireless communications circuitry and sensors in accordance with an embodiment.

An electronic device such as electronic device 10 of FIG. 1 may interact with nodes in a system. The term "node" may be used to refer to an electronic device, an object without electronics, and/or a particular location. In some arrangements, nodes may be associated with a mapped environment (e.g., the term node may refer to a device, object, or location in a mapped environment). Electronic device 10 may have control circuitry that determines where other nodes are located relative to electronic device 10. The control circuitry in device 10 may synthesize information from cameras, motion sensors, wireless circuitry such as antennas, and other input-output circuitry to determine how far a node is relative to device 10 and/or to determine the orientation of device 10 relative to that node. The control circuitry may use output components in device 10 to provide output (e.g., display output, audio output, haptic output, or other suitable output) to a user of device 10 based on the position of the node. The control circuitry may, for example, use antenna signals and motion data to determine the angle of arrival of signals from other electronic devices to thereby determine the locations of those electronic devices relative to the user's electronic device.

Antennas in device 10 may include cellular telephone antennas, wireless local area network antennas (e.g., WiFi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 10 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. Buttons such as button 16 may also be formed from capacitive touch sensors, light-based touch sensors, or other structures that can operate through the display cover layer without forming an opening.

If desired, an opening may be formed in the display cover layer to accommodate a port such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 such as in metal sidewall structures (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under dielectric portions of device 10 (e.g., portions of the display cover layer, portions of a plastic antenna window in a metal housing sidewall portion of housing 12, etc.). With one illustrative configuration, some or all of rear face of device 10 may be formed from a dielectric. For example, the rear wall of housing 12 may be formed from glass plastic, ceramic, other dielectric. In this type of arrangement, antennas may be mounted within the interior of device 10 in a location that allows the antennas to transmit and receive antenna signals through the rear wall of device 10 (and, if desired, through optional dielectric sidewall portions in housing 12). Antennas may also be formed from metal sidewall structures in housing 12 and may be located in peripheral portions of device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, under a dielectric rear wall of housing 12, or elsewhere in device 10. As an example, antennas may be mounted at one or both ends 50 of device 10 (e.g., along the upper and lower edges of housing 12, at the corners of housing 12, etc.).

Figure 2:
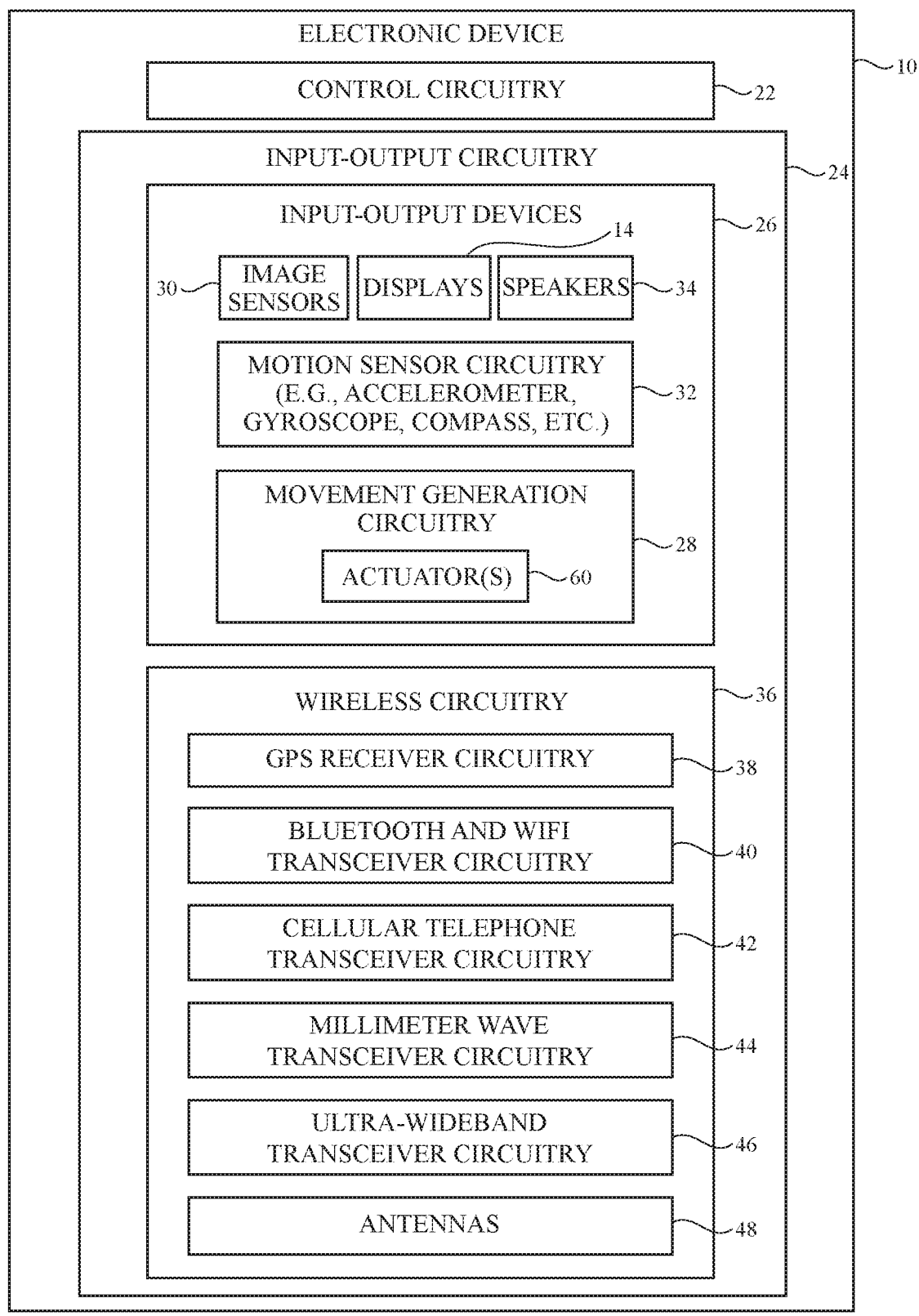
FIG. 2 is a schematic diagram of an illustrative electronic device with wireless communications circuitry and sensors in accordance with an embodiment.

A schematic diagram of illustrative components that may be used in device 10 is shown in FIG. 2. As shown in FIG. 2, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more displays 14 (e.g., touch screens or displays without touch sensor capabilities), one or more image sensors 30 (e.g., digital image sensors), motion sensors 32, and speakers 34. Input-output devices 26 may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 30 may include one or more visible digital image sensors (visible-light cameras) and/or one or more infrared digital image sensors (infrared-light cameras). Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors). If desired, control circuitry 22 may use display 14 to display a visual representation of the mapped environment.

Input-output devices 26 may include motion sensor circuitry 32. Motion sensor circuitry 32 may include one or more accelerometers (e.g., accelerometers that measure acceleration along one, two, or three axes), gyroscopes, barometers, magnetic sensors (e.g., compasses), image sensors (e.g., image sensor 30) and other sensor structures. Sensors 32 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 22 may be used to store and process motion sensor data. If desired, motion sensors, processing circuitry, and storage that form motion sensor circuitry may form part of a system-on-chip integrated circuit (as an example).

Input-output devices 26 may include movement generation circuitry 28. Movement generation circuitry 28 may receive control signals from control circuitry 22. Movement generation circuitry 28 may include electromechanical actuator circuitry that, when driven, moves device 10 in one or more directions. For example, movement generation circuitry 28 may laterally move device 10 and/or may rotate device 10 around one or more axes of rotation. Movement generation circuitry 28 may, for example, include one or more actuators 60 formed at one or more locations of device 10. When driven by a motion control signal, actuators 60 may move (e.g., vibrate, pulse, tilt, push, pull, rotate, etc.) to cause device 10 to move or rotate in one or more directions. The movement may be slight (e.g., not noticeable or barely noticeable to a user of device 10), or the movement may be substantial. Actuators 60 may be based on one or more vibrators, motors, solenoids, piezoelectric actuators, speaker coils, or any other desired device capable of mechanically (physically) moving device 10.

Some or all of movement generation circuitry 28 such as actuators 60 may be used to perform operations that are unrelated to rotation of device 10. For example, actuators 60 may include vibrators that are actuated to issue a haptic alert or notification to a user of device 10. Such alerts may include, for example, a received text message alert identifying that device 10 has received a text message, a received telephone call alert, a received email alert, an alarm notification alert, a calendar notification alert, or any other desired notification. By actuating actuator 60, device 10 may inform the user of any desired device condition.

Motion sensor circuitry 32 may sense motion of device 10 that is generated by movement generation circuitry 28. If desired, motion sensor circuitry 32 may provide feedback signals associated with the sensed motion of device 10 to movement generation circuitry 28. Movement generation circuitry 28 may use the feedback signals to control actuation of the movement generation circuitry.

Control circuitry 22 may use motion sensor circuitry 32 and/or movement generation circuitry 28 to determine the angle of arrival of wireless signals received by device 10 from another electronic device. For example, control circuitry 22 may use movement generation circuitry 28 to move device 10 from one position to another. Motion sensor circuitry 32 may be used to track the movement of device 10 as it is moved between the different positions. At each position, control circuitry 22 may receive wireless signals from another electronic device. Control circuitry 22 may process the received wireless signals together with the motion data from motion sensor circuitry 32 to more accurately determine the position of the other electronic device.

The use of motion generation circuitry 28 is merely illustrative, however. If desired, motion sensor circuitry 32 may track movement of device 10 that is not caused by motion generation circuitry 28. This may include a user's natural, unprompted movement of device 10 and/or the user's movement of device 10 after the user is prompted (by display 14, speakers 34, a haptic output device in device 10, or any other suitable output device) to move device 10 in a particular fashion.

Other sensors that may be included in input-output devices 26 include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, and other suitable sensors.

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive RF components, one or more antennas 48, transmission lines, and other circuitry for handling RF wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.11ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band, a 6.5 GHz frequency band, an 8 GHz frequency band, and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic. As shown in FIG. 1, for example, a portion of plastic-filled opening 20 may run up one or more of the sidewalls of housing 12.

Figure 3:
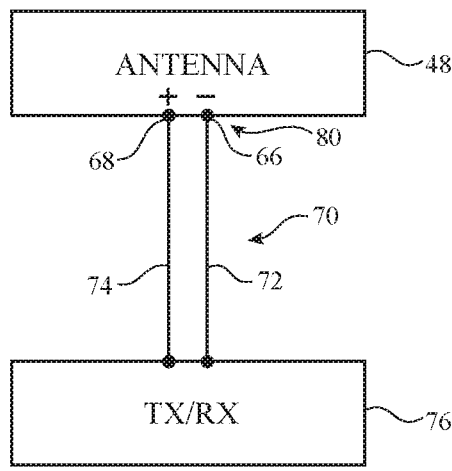
FIG. 3 is a diagram of an illustrative transceiver circuit and antenna in accordance with an embodiment.

A schematic diagram of a millimeter wave antenna or other antenna 48 coupled to transceiver circuitry 76 (e.g., wireless local area network transceiver circuitry 40, cellular telephone transceiver circuitry 42, millimeter wave transceiver circuitry 44, ultra-wideband transceiver circuitry 46, and/or other transceiver circuitry in wireless circuitry 36) is shown in FIG. 3. As shown in FIG. 3, radio-frequency transceiver circuitry 76 may be coupled to antenna feed 80 of antenna 48 using transmission line 70. Antenna feed 80 may include a positive antenna feed terminal such as positive antenna feed terminal 68 and may have a ground antenna feed terminal such as ground antenna feed terminal 66. Transmission line 70 may be formed from metal traces on a printed circuit or other conductive structures and may have a positive transmission line signal path such as path 74 that is coupled to terminal 68 and a ground transmission line signal path such as path 72 that is coupled to terminal 66. Transmission line paths such as path 70 may be used to route antenna signals within device 10. For example, transmission line paths may be used to couple antenna structures such as one or more antennas in an array of antennas to transceiver circuitry 76. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 70 and/or circuits such as these may be incorporated into antenna 48 (e.g., to support antenna tuning, to support operation in desired frequency bands, etc.).

If desired, signals for millimeter wave antennas may be distributed within device 10 using intermediate frequencies (e.g., frequencies of about 5-15 GHz rather than 60 Hz). The intermediate frequency signals may, for example, be distributed from a baseband processor or other wireless communications circuit located near the middle of device 10 to one or more arrays of millimeter wave antennas at the corners of device 10. At each corner, upconverter and downconverter circuitry may be coupled to the intermediate frequency path. The upconverter circuitry may convert received intermediate frequency signals from the baseband processor to millimeter wave signals (e.g., signals at 60 GHz) for transmission by a millimeter wave antenna array. The downconverter circuitry may downconvert millimeter wave antenna signals from the millimeter wave antenna array to intermediate frequency signals that are then conveyed to the baseband processor over the intermediate frequency path.

Device 10 may contain multiple antennas 48. The antennas may be used together or one of the antennas may be switched into use while other antenna(s) are switched out of use. If desired, control circuitry 22 may be used to select an optimum antenna to use in device 10 in real time and/or to select an optimum setting for adjustable wireless circuitry associated with one or more of antennas 48. Antenna adjustments may be made to tune antennas to perform in desired frequency ranges, to perform beam steering with a phased antenna array, and to otherwise optimize antenna performance. Sensors may be incorporated into antennas 48 to gather sensor data in real time that is used in adjusting antennas 48.

In some configurations, antennas 48 may include antenna arrays (e.g., phased antenna arrays to implement beam steering functions). For example, the antennas that are used in handling millimeter wave signals for extremely high frequency wireless transceiver circuits 44 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 4:
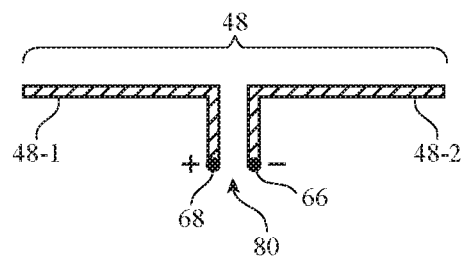
FIG. 4 is a diagram of an illustrative dipole antenna in accordance with an embodiment.

An illustrative dipole antenna is shown in FIG. 4. As shown in FIG. 4, dipole antenna 48 may have first and second arms such as arms 48-1 and 48-2 and may be fed at antenna feed 80. If desired, a dipole antenna such as dipole antenna 48 of FIG. 4 may be incorporated into a Yagi antenna (e.g., by incorporating a reflector and directors into dipole antenna 48 of FIG. 4).

Figure 5:
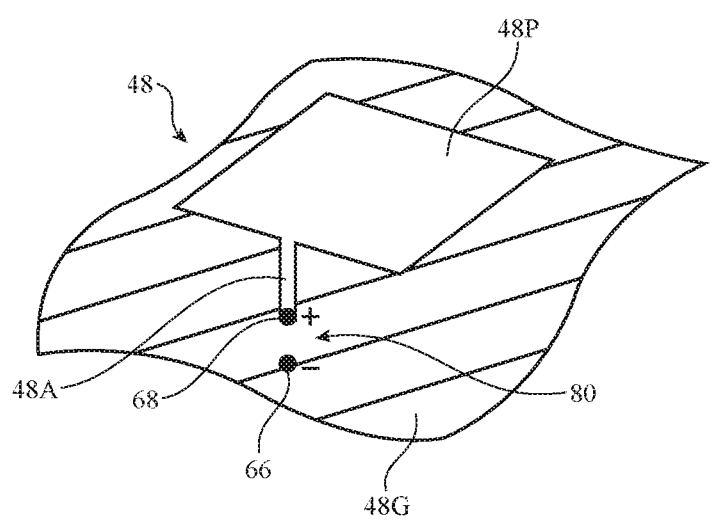
FIG. 5 is a perspective view of an illustrative patch antenna that may be used in an electronic device in accordance with an embodiment.

An illustrative patch antenna is shown in FIG. 5. As shown in FIG. 5, patch antenna 48 may have a patch antenna resonating element 48P that is separated from and parallel to a ground plane such as antenna ground plane 48G. Arm 48A may be coupled between patch antenna resonating element 48P and positive antenna feed terminal 68 of antenna feed 80. Ground antenna feed terminal 66 of feed 80 may be coupled to ground plane 48G.

Antennas of the types shown in FIGS. 4 and 5 and/or other antennas 48 may be used in forming millimeter wave antennas. The examples of FIGS. 4 and 5 are merely illustrative.

Figure 6:
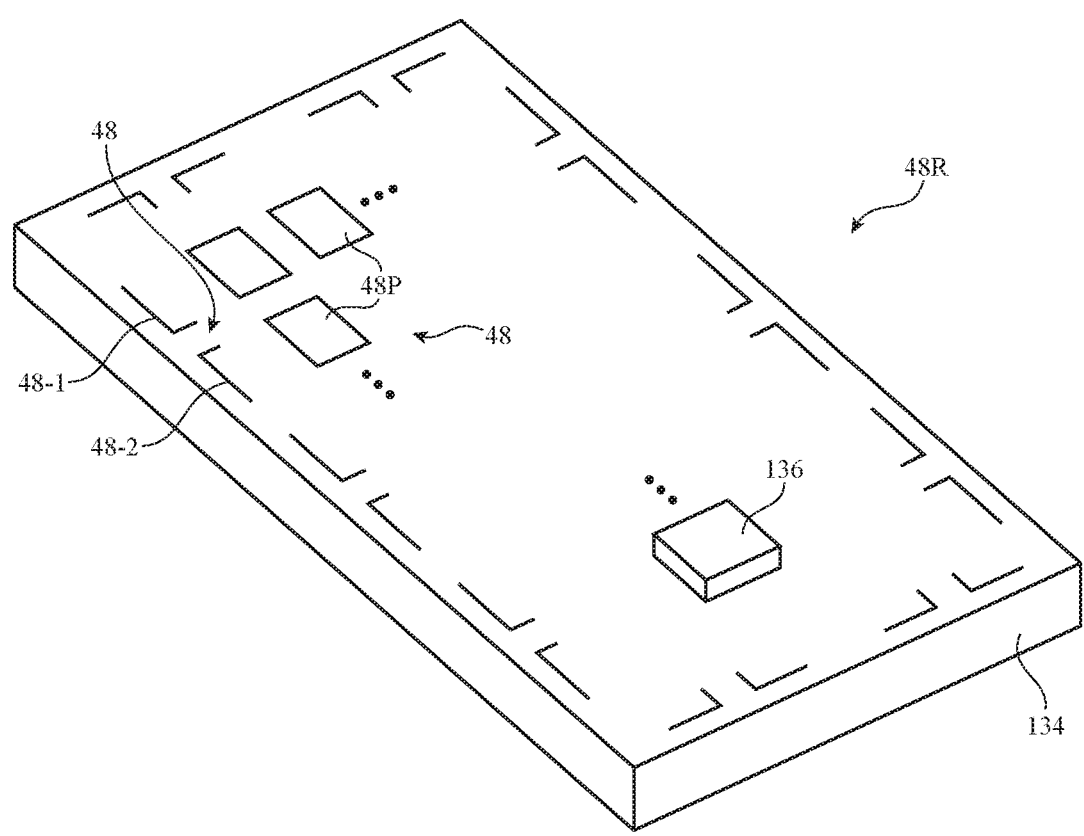
FIG. 6 is a perspective view of an illustrative array of millimeter wave antennas on a millimeter wave antenna array substrate in accordance with an embodiment.

FIG. 6 is a perspective view of an illustrative millimeter wave antenna array 48R formed from antenna resonating elements on millimeter wave antenna array substrate 134. Array 48R may include an array of millimeter wave antennas such as patch antennas 48 formed from patch antenna resonating elements 48P and dipole antennas 48 formed from arms 48-1 and 48-2. With one illustrative configuration, dipole antennas 48 may be formed around the periphery of substrate 134 and patch antennas 48 may form an array on the central surface of substrate 134. There may be any suitable number of millimeter wave antennas 48 in array 48R. For example, there may be 10-40, 32, more than 5, more than 10, more than 20, more than 30, fewer than 50, or other suitable number of millimeter wave antennas (patch antennas and/or dipole antennas, etc.). Substrate 134 may be formed from one or more layers of dielectric (polymer, ceramic, etc.) and may include patterned metal traces for forming millimeter wave antennas and signal paths. The signals paths may couple the millimeter wave antennas to circuitry such as one or more electrical devices 136 mounted on substrate 134. Device(s) 136 may include one or more integrated circuits, discrete components, upconverter circuitry, downconverter circuitry, (e.g., upconverter and downconverter circuitry that forms part of a transceiver), circuitry for adjusting signal amplitude and/or phase to perform beam steering, and/or other circuitry for operating antenna array 48R.

Figure 7:
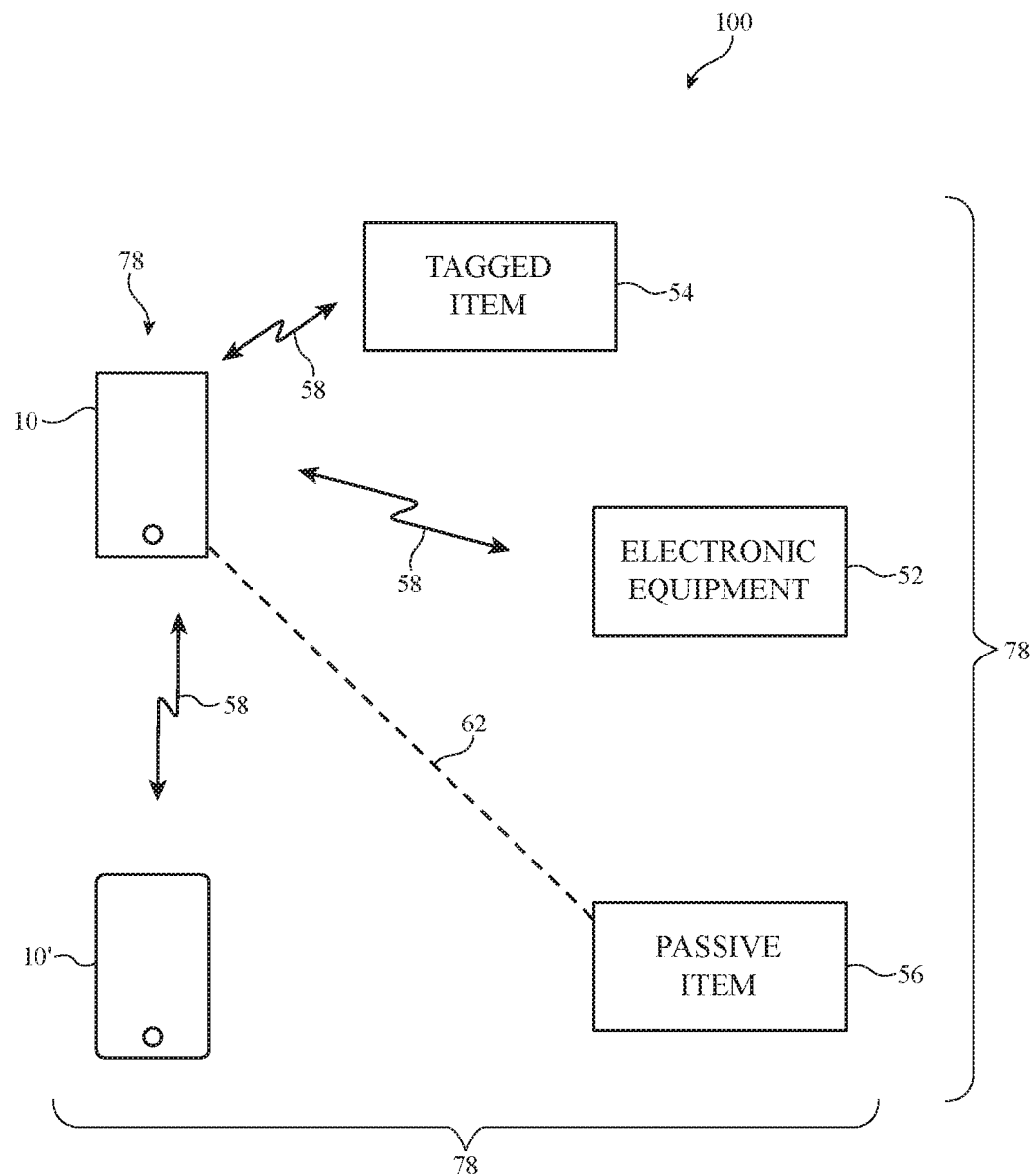
FIG. 7 is a diagram of an illustrative system having nodes in accordance with an embodiment.

FIG. 7 is a diagram of an illustrative system of objects that electronic device 10 may recognize and/or communicate wirelessly with. System 100 may include nodes 78. Nodes 78 in system 100 may be electronic devices, may be objects without electronics, or may be particular locations in a mapped environment. Nodes 78 may be passive or active. Active nodes in system 100 may include devices that are capable of receiving and/or transmitting wireless signals such as signals 58. Active nodes in system 100 may include tagged items such as tagged item 54, electronic equipment such as electronic equipment 52, and other electronic devices such as electronic devices 10' (e.g., devices of the type described in connection with FIG. 2, including some or all of the same wireless communications capabilities as device 10). Tagged item 54 may be any suitable object that has been provided with a wireless receiver and/or a wireless transmitter. For example, tagged item 54 may be a key fob, a cellular telephone, a wallet, a laptop, a book, a pen, or other object that has been provided with a low-power transmitter (e.g., an RFID transmitter or other transmitter). Device 10 may have a corresponding receiver that detects the transmitted signals 58 from item 54 and determines the location of item 54 based on the received signals. In some arrangements, tagged item 54 may not include an internal power source and may instead be powered by electromagnetic energy from device 10 or other device. In other arrangements, tagged item 54 may include an internal power source.

Electronic equipment 52 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with nodes 54, 52, and 10' using communications signals 58. Communications signals 58 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 58 may be used to convey information such as location and orientation information. For example, control circuitry 22 in device 10 may determine the location of active nodes 54, 52, and 10' relative to device 10 using wireless signals 58. Control circuitry 22 may also use image data from image sensors 30, motion sensor data from motion sensors 32, and other sensor data (e.g., proximity data from a proximity sensor, etc.) to determine the location of active nodes 54, 52, and 10'.

Passive nodes in system 100 such as passive item 56 may include objects that do not emit or receive radio-frequency signals such as furniture, buildings, doors, windows, walls, people, pets, and other items. Item 56 may be an item that device 10 recognizes through feature tracking (e.g., using image sensor 30) or item 56 may be a particular location having an associated set of coordinates in a mapped environment. For example, control circuitry 22 may construct a virtual three-dimensional map of an environment (or may receive and store a previously-constructed three-dimensional map of an environment) and may assign objects or locations in the environment a set of coordinates (e.g., geographical coordinates, Cartesian coordinates, horizontal coordinates, spherical coordinates, or other suitable coordinates) in the three-dimensional map. In some arrangements, the virtual three-dimensional map may be anchored by one or more items with a known location (e.g., may be anchored by one or more tagged items 54 having a known location, electronic equipment 52 having a known location, or other items with a known location). Device 10 may then assign coordinates to passive items such as item 56 based on where passive item 56 is located relative to the anchored items in system 100. Device 10 may store the coordinates of passive item 56 and may take certain actions when device 10 is in a certain location or orientation relative to item 56. For example, if a user points device 10 in direction 62, control circuitry 22 may recognize that device 10 is being pointed at item 56 and may take certain actions (e.g., may display information associated with item 56 on display 14, may provide audio output via speakers 34, may provide haptic output via a vibrator or haptic actuator in device 10, and/or may take other suitable action). Because passive item 56 does not send or receive communication signals, circuitry 22 may use image data from image sensors 30, motion sensor data from motion sensors 32, and other sensor data (e.g., proximity data from a proximity sensor, etc.) to determine the location of passive item 56 and/or to determine the orientation of device 10 relative to item 56 (e.g., to determine when device 10 is being pointed at item 56).

Figure 8:
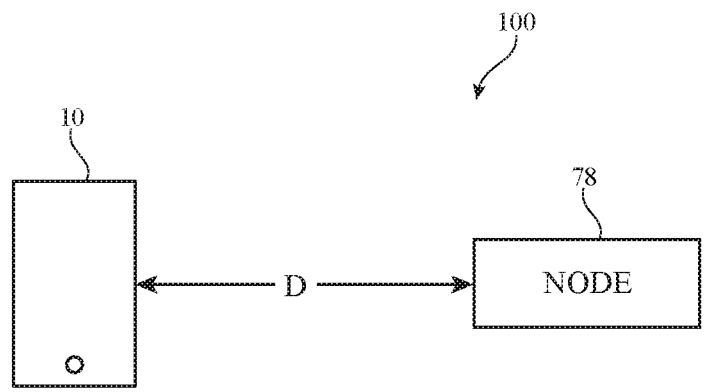
FIG. 8 is a diagram illustrating how a distance between an illustrative electronic device and a node in a system may be determined in accordance with an embodiment.

FIG. 8 shows how device 10 may determine a distance D between device 10 and node 78. In arrangements where node 78 is capable of sending or receiving communications signals (e.g., tagged item 54, electronic equipment 52, or other electronic devices 10' of FIG. 7), control circuitry 22 may determine distance D using communication signals (e.g., signals 58 of FIG. 7). Control circuitry 22 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 22 may determine distance D using Global Positioning System receiver circuitry 38, using proximity sensors (e.g., infrared proximity sensors or other proximity sensors), using image data from camera 30, motion sensor data from motion sensors 32, and/or using other circuitry in device 10.

Control circuitry 22 may also determine distance D using sensors such as infrared proximity sensors, depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, image sensors such as camera 30, and/or using other circuitry in device 10. In some arrangements, device 10 may store a set of coordinates for node 78, indicating where node 78 is located relative to other items in system 100. By knowing the location of node 78 relative to anchored nodes in system 100 and knowing the location of the anchored nodes relative to device 10, device 10 can determine the distance D between device 10 and node 78. These types of methods may be useful in scenarios where node 78 is a passive item that does not send or receive wireless communications signals. However, control circuitry 22 may also employ these techniques in scenarios where node 78 is capable of wireless communications.

Figure 9:
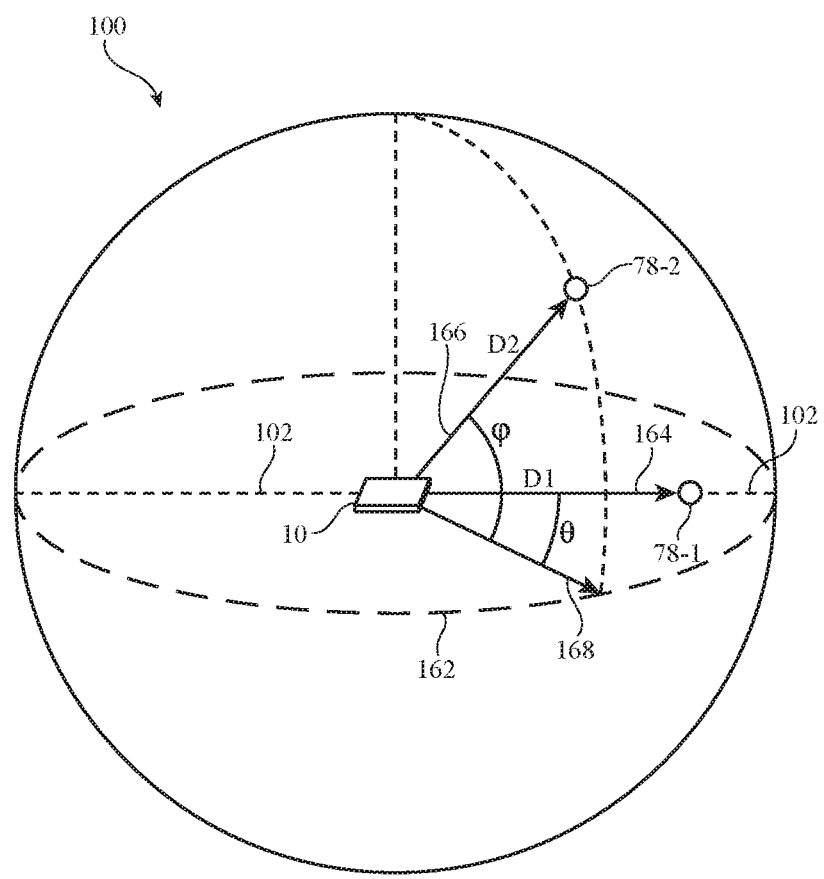
FIG. 9 is a diagram showing how a location and orientation of an illustrative electronic device relative to a node in a system may be determined in accordance with an embodiment.

In addition to determining the distance between device 10 and nodes 78 in system 100, control circuitry 22 may be configured to determine the orientation of device 10 relative to nodes 78. FIG. 9 is a diagram showing how control circuitry 22 may use a horizontal coordinate system to define the position and orientation of device 10 relative to nearby nodes such as first node 78-1 and second node 78-2 may be determined. In this type of coordinate system, control circuitry 22 may determine an azimuth angle θ and elevation angle φ to describe the position of nearby nodes 78 relative to device 10. Control circuitry 22 may define a reference plane such as local horizon 162 and a reference vector such as reference vector 164. Local horizon 162 may be a plane that intersects device 10 and that is defined relative to a surface of device 10. For example, local horizon 162 may be a plane that is parallel to or coplanar with display 14 of device 10. Reference vector 164 (sometimes referred to as the "north" direction) may be a vector in local horizon 162. If desired, reference vector 164 may be aligned with longitudinal axis 102 of device 10 (e.g., an axis running lengthwise down the center of device 10). When reference vector 164 is aligned with longitudinal axis 102 of device 10, reference vector 164 may correspond to the direction in which device 10 is being pointed.

Azimuth angle θ and elevation angle γ may be measured relative to local horizon 162 and reference vector 164. As shown in FIG. 9, the elevation angle γ (sometimes referred to as altitude) of node 78-2 is the angle between node 78-2 and device 10's local horizon 162 (e.g., the angle between vector 166 extending between device 10 and node 78-2 and a coplanar vector 168 extending between device 10 and horizon 162). The azimuth angle θ of node 78-2 is the angle of node 78-2 around local horizon 162 (e.g., the angle between reference vector 164 and vector 168).

In the example of FIG. 9, the azimuth angle and elevation angle of node 78-1 are both 0° because node 78-1 is located in the line of sight of device 10 (e.g., node 78-1 intersects with reference vector 164 and horizontal plane 162). The azimuth angle θ and elevation angle γ of node 78-2, on the other hand, is greater than 0°. Control circuitry 22 may use a threshold azimuth angle and/or a threshold elevation angle to determine whether a nearby node is sufficiently close to the line of sight of device 10 to trigger appropriate action. As described below in connection with FIGS. 10-16, control circuitry 22 may combine angle of arrival antenna measurements with motion sensor data to determine the azimuth angle θ and elevation angle γ of nearby nodes such as nodes 78-1 and 78-2.

Control circuitry 22 may also determine the proximity of nearby nodes 78 relative to device 10. As shown in FIG. 9, for example, control circuitry 22 may determine that node 78-1 is a distance D1 from device 10 and that node 78-2 is a distance D2 from device 10. Control circuitry 22 may determine proximity information using methods of the type described in connection with FIG. 8. For example, control circuitry 22 may determine proximity using wireless communications signals (e.g., signals 58 of FIG. 7), using distance sensors (e.g., infrared proximity sensors, structured light depth sensors, stereoscopic sensors, or other distance sensors), using motion sensor data from motion sensors 32 (e.g., data from an accelerometer, a gyroscope, a compass, or other suitable motion sensor), using image data from camera 30, and/or using other circuitry in device 10. Control circuitry 22 may use a threshold distance to determine whether a nearby node is sufficiently close to device 10 to trigger appropriate action.

If desired, other axes besides longitudinal axis 102 may be used as reference vector 164. For example, control circuitry 22 may use a horizontal axis that is perpendicular to longitudinal axis 102 as reference vector 164. This may be useful in determining when nodes 78 are located next to a side portion of device 10 (e.g., when device 10 is oriented side-to-side with one of nodes 78).

After determining the orientation of device 10 relative to nodes 78-1 and 78-2, control circuitry 22 may take suitable action. For example, in response to determining that node 78-1 is in the line of sight of device 10 and/or within a given range of device 10, control circuitry 22 may send information to node 78-1, may request and/or receive information from 78-1, may use display 14 to display a visual indication of wireless pairing with node 78-1, may use speakers 34 to generate an audio indication of wireless pairing with node 78-1, may use a vibrator, a haptic actuator, or other mechanical element to generate haptic output indicating wireless pairing with node 78-1, and/or may take other suitable action.

In response to determining that node 78-2 is located at azimuth angle θ, elevation angle φ, and distance D2, relative to device 10, control circuitry 22 may use display 14 to display a visual indication of the location of node 78-2 relative to device 10, may use speakers 34 to generate an audio indication of the location of node 78-2, may use a vibrator, a haptic actuator, or other mechanical element to generate haptic output indicating the location of node 78-2, and/or may take other suitable action.

Figure 10:
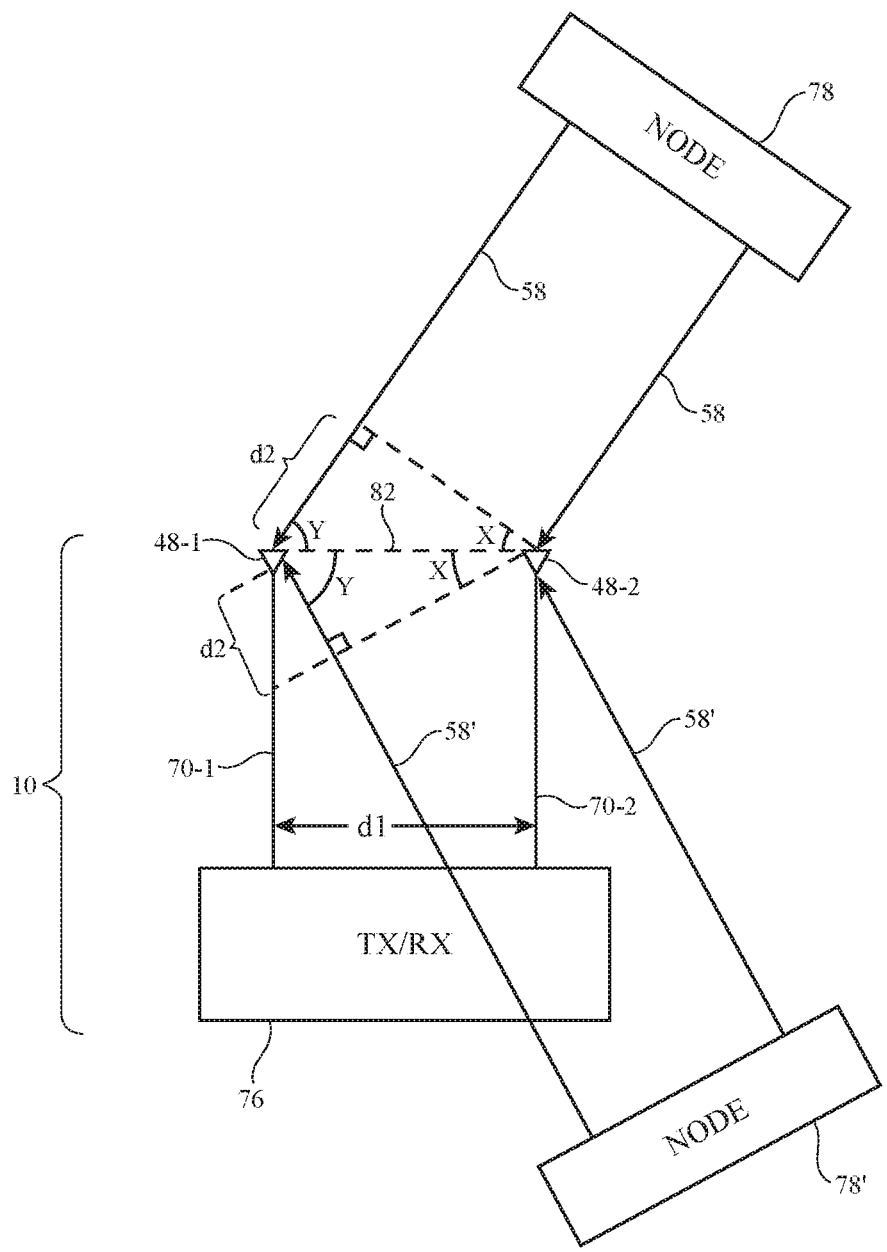
FIG. 10 is a schematic diagram showing how illustrative antenna structures in an electronic device may be used for detecting angle of arrival in accordance with an embodiment.

FIG. 10 is a schematic diagram showing how angle of arrival measurement techniques may be used to determine the orientation of device 10 relative to nodes 78. As shown in FIG. 10, electronic device 10 may include multiple antennas (e.g., a first antenna 48-1 and a second antenna 48-2) coupled to transceiver circuitry 76 by respective transmission lines 70 (e.g., a first transmission line 70-1 and a second transmission line 70-2). Antennas 48-1 and 48-2 may each receive a wireless signal 58 from node 78. Antennas 48-1 and 48-2 may be laterally separated by a distance d1, where antenna 48-1 is farther away from node 78 than 48-2 (in the example of FIG. 10). Therefore, wireless communications signal 58 travels a greater distance to reach antenna 48-1 than 48-2. The additional distance between node 78 and antenna 48-1 is shown in FIG. 10 as distance d2. FIG. 10 also shows angles x and y (where x+y=90°).

Distance d2 may be determined as a function of angle γ or angle x (e.g., $d2=d1\ \sin(x)$ or $d2=d1\ \cos(y)$). Distance d2 may also be determined as a function of the phase difference between the signal received by antenna 48-1 and the signal received by antenna 48-2 (e.g., $d2=(\Delta\phi\lambda)/(2\pi)$, where $\Delta\phi$ is the phase difference between the signal received by antenna 48-1 and the signal received by antenna 48-2 and λ is the wavelength of the received signal 58). Electronic device 10 may have phase measurement circuitry coupled to each antenna to measure the phase of the received signals and identify a difference in the phases ($\Delta\phi$). The two equations for d2 may be set equal to each other (e.g., $d1\ \sin(x)=(\Delta\phi\lambda)/(2\pi)$) and rearranged to solve for angle x (e.g., $x=\sin^{-1}(\Delta\phi\lambda)/(2\pi d1)$) or may be rearranged to solve for angle γ. As such, the angle of arrival may be determined (e.g., by control circuitry 22) based on the known (predetermined) distance between antennas 48-1 and 48-2, the detected (measured) phase difference between the signal received by antenna 48-1 and the signal received by antenna 48-2, and the known wavelength or frequency of the received signals 58.

Distance d1 may be selected to ease the calculation for phase difference between the signal received by antenna 48-1 and the signal received by antenna 48-2. For example, d1 may be less than or equal to one half of the wavelength (e.g., effective wavelength) of the received signal 58 (e.g., to avoid multiple phase difference solutions).

Some antenna arrangements may be sufficient for resolving the "complete" angle of arrival of signals 58 without ambiguity. A complete angle of arrival (sometimes referred to as the direction of arrival) includes an azimuth angle θ and an elevation angle γ of node 78 relative to device 10 (as shown in FIG. 9).

Antennas that are located in a three-dimensional arrangement (e.g., spanning multiple planes) may be sufficient to determine the complete angle of arrival of signals 58 without ambiguity. However, when the baseline vectors (i.e., the vectors that extend between respective pairs of antennas) are all located in one plane, there may be some ambiguity as to the correct azimuth angle θ and/or the correct elevation angle γ of signals 58. In the two-antenna arrangement of FIG. 10, for example, there is only one baseline vector 82, which yields an accurate, unambiguous azimuth angle θ, but may not provide sufficient information to determine elevation angle φ. Thus, node 78' with a different elevation angle may nonetheless produce signals 58' with the same phase difference $\Delta\phi$ between the signal received by antenna 48-1 and the signal received by antenna 48-2 as signals 58. In other words, different directions of arrival may result in the same phase difference. This leads to an ambiguity in the angle of arrival solution. Without other information, control circuitry 22 may be able to determine the azimuth angle θ of signals 58, but may be unable to determine elevation angle γ of signals 58. Systems with three or more coplanar antennas will resolve some but not all ambiguities in the angle of arrival because the baseline vectors will still be located in the same plane.

To help resolve ambiguities in the complete angle of arrival, control circuitry 22 may combine antenna signals with motion data gathered using motion sensor circuitry 32. In particular, control circuitry 22 may obtain angle of arrival measurements (e.g., measurements of azimuth angle θ and/or elevation angle φ) while device 10 is in multiple different positions. At each position, antennas 48 may receive signals 58 from node 78 and control circuitry 22 may determine the possible angle of arrival solutions based on the phase difference between signals received by antenna 48-1 and signals received by antenna 48-2. Motion sensor circuitry 32 may track the movement of device 10 as it is moved from one position to another. Using the motion data from motion sensor circuitry 32, control circuitry 22 may associate each set of angle of arrival solutions with a different baseline vector 82. The baseline vectors may span multiple planes, thus providing sufficient information for control circuitry 22 to determine the correct angle of arrival, just as if device 10 had a multi-planar antenna arrangement.

It should be understood that using a horizontal coordinate system and representing the complete angle of arrival with azimuth and elevation angles is merely illustrative. If desired, a Cartesian coordinate system may be used and the angle of arrival may be expressed using a unit direction vector that is represented using x, y, and z coordinates. Other coordinate systems may also be used. A horizontal coordinate system is sometimes described herein as an illustrative example.

Figure 11:
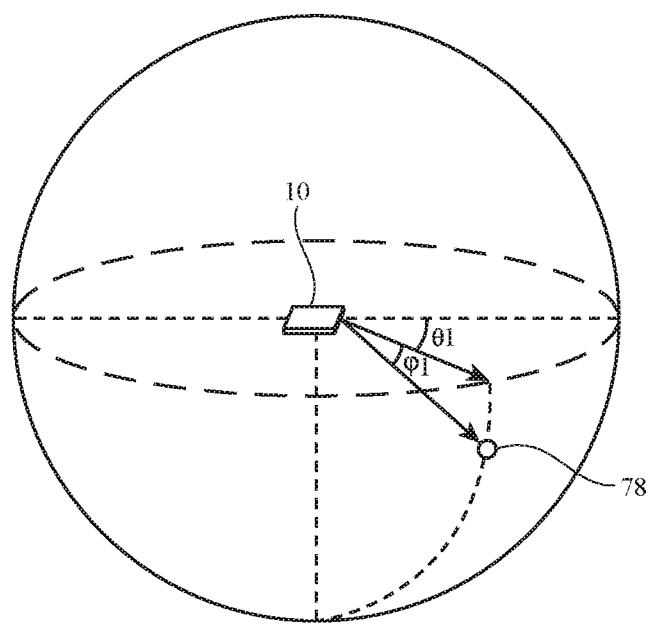
FIG. 11 is a diagram showing how angle of arrival solutions may be obtained when an electronic device is in a first position in accordance with an embodiment.
Figure 12:
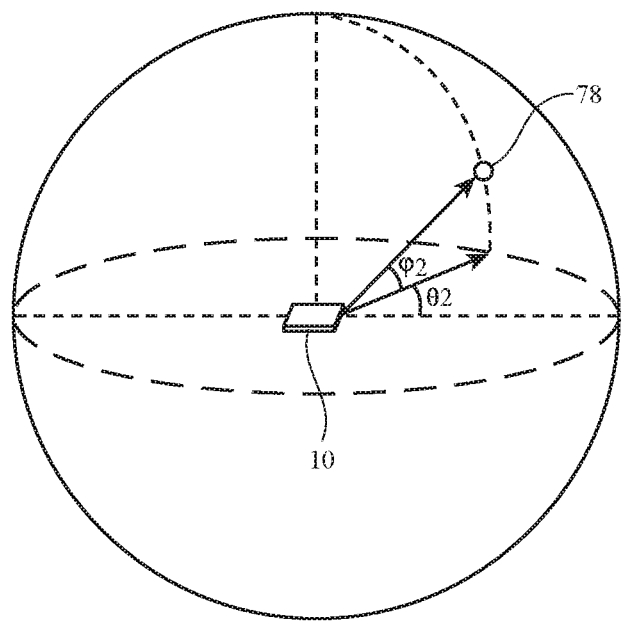
FIG. 12 is a diagram showing how angle of arrival solutions may be obtained when an electronic device is in a second position in accordance with an embodiment.
Figure 13:
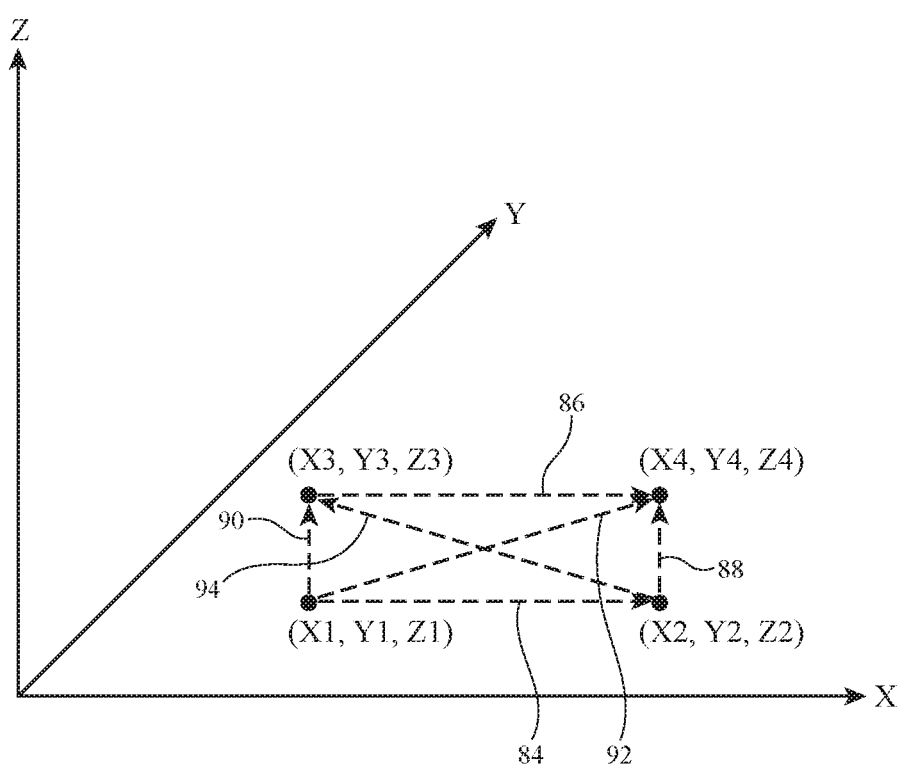
FIG. 13 is a graph showing how angle of arrival solutions may be obtained as an electronic device is moved from one position to another in accordance with an embodiment.

FIGS. 11, 12, and 13 illustrate an example of how control circuitry 22 may determine the accurate position (e.g., a complete angle of arrival solution) of node 78 relative to device 10 using motion data and antenna signals. Motion sensor circuitry 32 may gather motion data as device 10 is moved from a first position (FIG. 11) to a second position (FIG. 12). The movement of device 10 may be achieved using motion generation circuitry 28 or may be achieved without motion generation circuitry 28 (e.g., the motion may be due to the user's unprompted movement of device 10 or may be due to the user's movement of device 10 following a prompt from device 10).

In the first position of FIG. 11, node 78 has azimuth angle θ1 and elevation angle φ1 relative to device 10. While device 10 is in the first position of FIG. 11, antennas 48

(FIG. 10) may receive signals from node 78, and control circuitry 22 may determine a first set of possible angle of arrival solutions based on the measured phase difference between the signals received by antenna 48-1 and the signals received by antenna 48-2. Because control circuitry 22 only has phase difference information from antennas 48 in the first position of FIG. 11 at this point, the first set of possible angle of arrival solutions may include an azimuth angle (e.g., θ1) but the elevation angle may remain unknown.

Device 10 is then tilted into the second position of FIG. 12, where node 78 has azimuth angle θ2 and elevation angle φ2 relative to device 10. While device 10 is in the second position of FIG. 12, antennas 48 may receive signals from node 78, and control circuitry 22 may determine a second set of possible angle of arrival solutions based on the measured phase difference between the signals received by antenna 48-1 and the signals received by antenna 48-2. As in the arrangement of FIG. 11, control circuitry 22 can determine the azimuth angle (e.g., θ2) using the phase difference measured in the second position of FIG. 12. However, control circuitry 22 also knows the phase difference measured while antennas 48 were in the first position. Using motion sensor circuitry 32 to track the movement of antennas 48, control circuitry can thus combine the phase difference information from the first and second positions with the motion data to obtain a single, complete angle of arrival solution, including an azimuth angle and an elevation angle.

FIG. 13 is a graph illustrating how the positions of antennas 48 may change as device 10 is moved from the first position of FIG. 11 to the second position of FIG. 12. When device 10 is in the first position of FIG. 11, antennas 48-1 and 48-2 may have coordinates (x1, y1, z1) and (x2, y2, z2), respectively. In this first position, vector 84 extending between antennas 48-1 and 48-2 may serve as baseline vector 82 of FIG. 10. When device 10 is moved into the second position of FIG. 12, antennas 48-1 and 48-2 may have coordinates (x3, y3, z3) and (x4, y4, z4), respectively. In this second position, vector 86 may serve as baseline vector 82 of FIG. 10. Using motion data from motion sensor circuitry 32, control circuitry 22 may also determine the locations of antennas 48 in the first position relative to the locations of antennas 48 in the second position. Assuming a phase coherency between the phase measurements at the first and second positions, this provides additional vectors 88, 90, 92, and 94, which may serve as additional baseline vectors (e.g., similar to baseline vector 82 of FIG. 10). Because these baseline vectors span three-dimensional space, control circuitry 22 may be able to determine a complete angle of arrival solution as if device 10 had a multi-planar antenna array.

If desired, antenna signals and motion data may be gathered as device 10 is moved into more than two different positions (e.g., three different positions, four different positions, five different positions, etc.), with a set of angle of arrival solutions gathered at each position. The example of FIGS. 11, 12, and 13 in which device 10 is moved only into two positions is merely illustrative.

Figure 14:
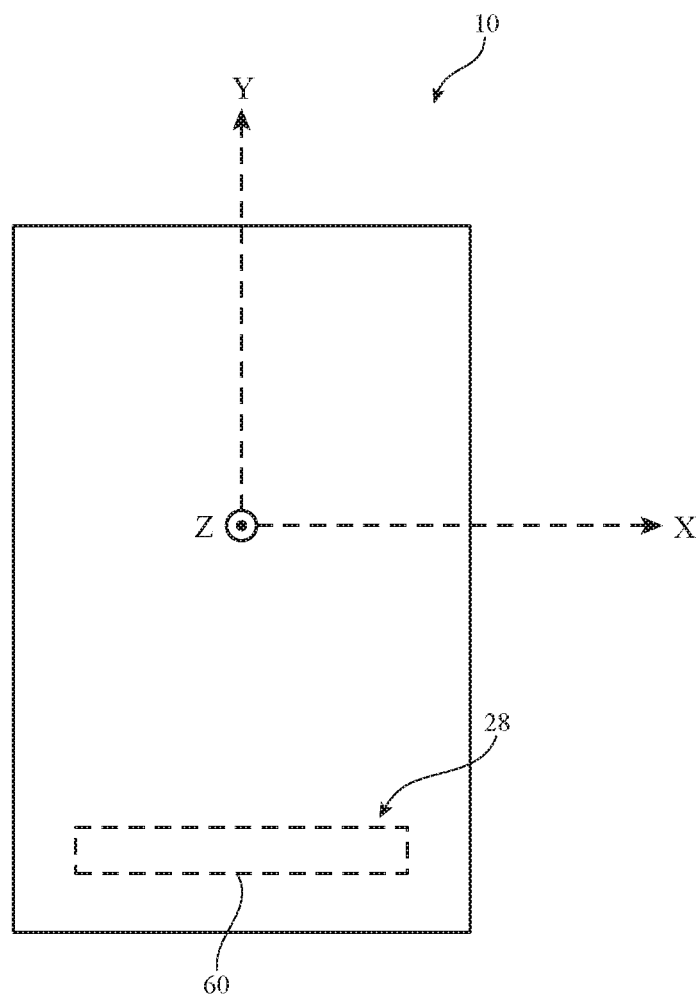
FIG. 14 is a top view of an illustrative electronic device having an actuator that moves the electronic device as control circuitry gathers motion data and antenna signals to determine an angle of arrival solution in accordance with an embodiment.

In some arrangements, motion of device 10 during angle of arrival measurement operations may be initiated by device 10 itself. An example of this type of arrangement is shown in FIG. 14. In this example, device 10 includes movement generation circuitry 28, which may include one or more actuators such as actuator 60. There may be one, two, three, four, or more than four actuators 60 in any suitable location of device 10 (along the sides, at the corners, etc.). The arrangement of FIG. 14 is merely illustrative. When it is desired to obtain angle of arrival information (e.g., to determine the position of a node such as node 78 relative to device 10), control circuitry 22 may issue control signals to movement generation circuitry 28 to initiate one or more movements of device 10. The movement may include linear motion along the x-axis, the y-axis, and/or the z-axis, may include rotational motion about the x-axis, the y-axis, and/or the z-axis, or may include a combination of linear and rotational motions.

Figure 15:
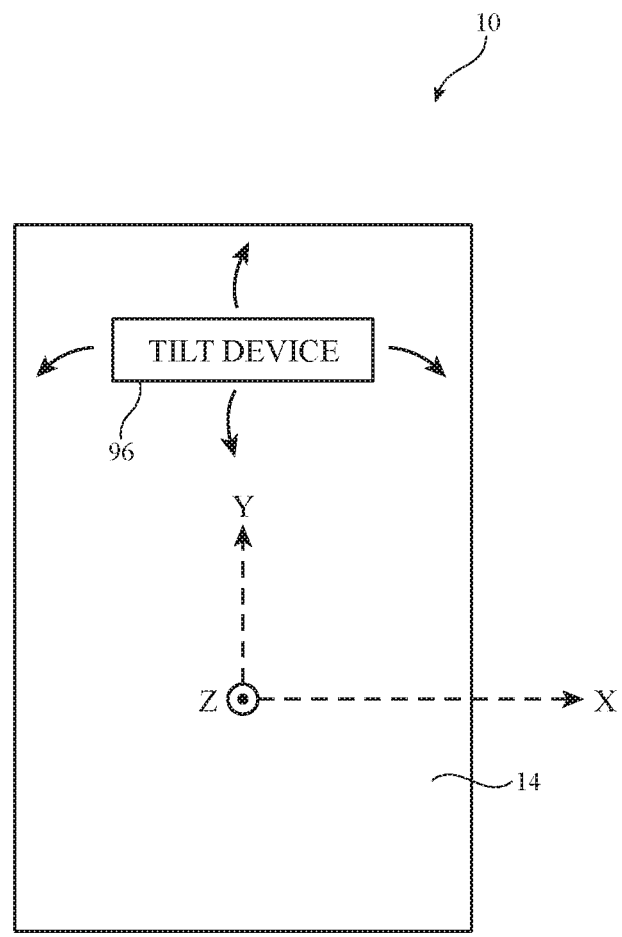
FIG. 15 is a top view of an illustrative electronic device having a display that instructs a user to move an electronic device as control circuitry gathers motion data and antenna signals to determine an angle of arrival solution in accordance with an embodiment.

In other arrangements, motion of device 10 may be achieved without motion generation circuitry 28 by instead relying upon the user's movement of device 10. This may include the user's natural, unprompted movement of device 10 (e.g., slight or substantial movements of device 10 as the user holds device 10), or this may include the user's movement of device 10 following a prompt from device 10. As shown in FIG. 15, for example, display 14 may display a prompt such as prompt 96 instructing the user to move device 10 in a particular manner (e.g., instructing the user to tilt, rotate, shake, lift, lower, or otherwise move device 10). The movement may include linear motion along the x-axis, the y-axis, and/or the z-axis, may include rotational motion about the x-axis, the y-axis, and/or the z-axis, or may include a combination of linear and rotational motions. Prompt 96 may change during angle of arrival measurement operations (e.g., may change after a set of signals 58 from node 78 are received by antennas 48 in a given position), or prompt 96 may remain the same throughout the process. Prompt 96 may include words, symbols (e.g., arrows, shapes, graphics, etc.), or other information. The use of display 14 to provide prompt 96 is merely illustrative. If desired, the visual prompt 96 of FIG. 15 may be replaced or augmented by a different type of prompt, such as audio output, haptic output, or other suitable output.

Figure 16:
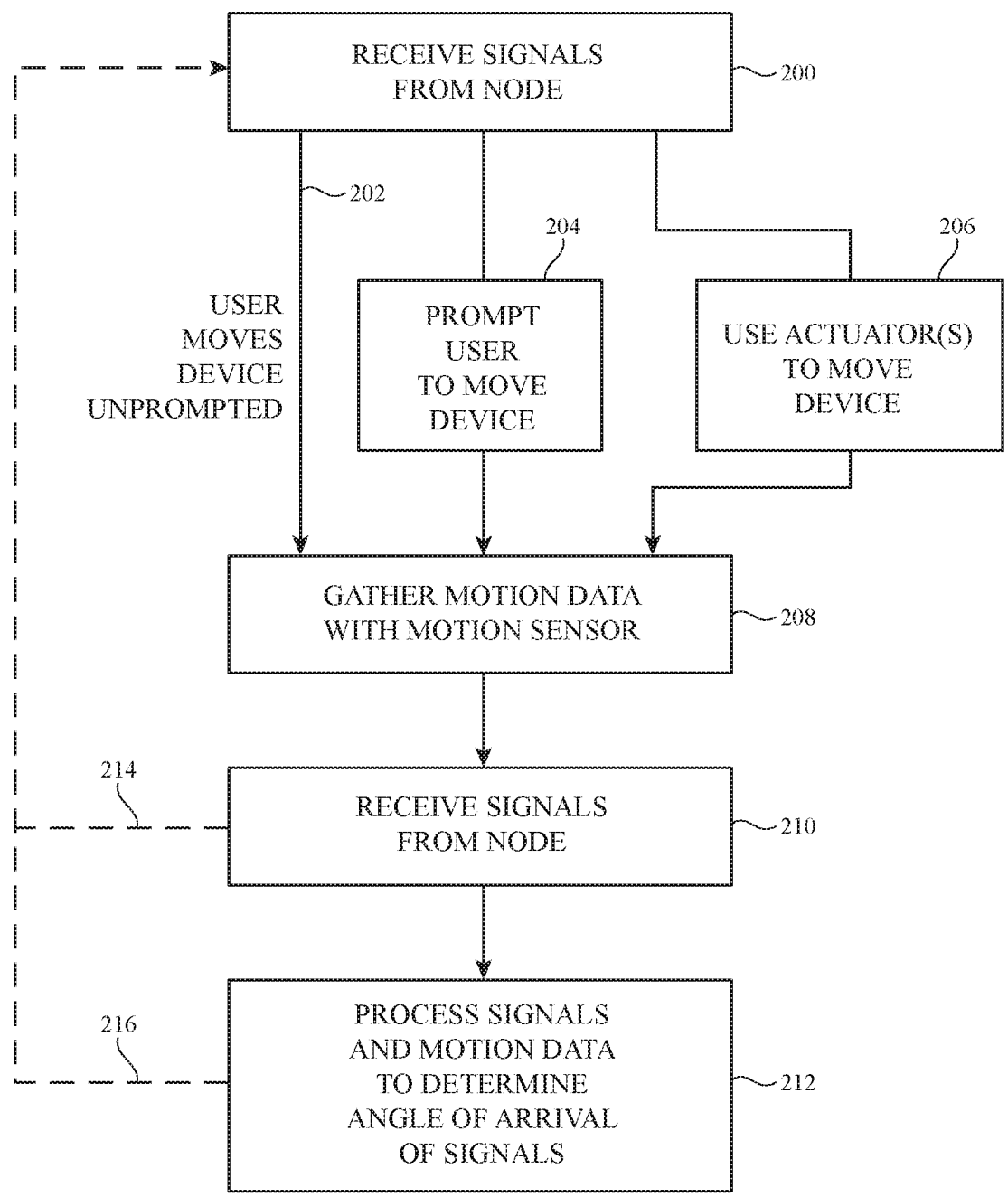
FIG. 16 is a flow chart of illustrative steps involved in determining the position of a node relative to an electronic device using antenna signals and motion data in accordance with an embodiment.

FIG. 16 is a flow chart of illustrative steps involved in determining the complete angle of arrival of signals from a node such as node 78 of FIGS. 7-12.

At step 200, antennas 48 of device 10 may receive wireless signals (e.g., signals 58 of FIG. 10) from node 78. The signals may include millimeter wave communication signals such as signals at 60 GHz, ultra-wideband radio frequency signals, and/or other radio-frequency wireless signals.

Following step 200, a user may move device 10 unprompted (as indicated by line 202), a user may move device 10 following a prompt (step 204), or device 10 may move itself using movement generation circuitry 28 (step 206).

In arrangements where device 10 is moved naturally and unprompted by the user, as indicated by line 202, the movement may include a slight or substantial movement of device 10 (e.g., a linear movement, a rotational movement, or a combination of linear and rotational movement of device 10).

In arrangements where the user is prompted to move device 10, operations may proceed from step 200 to step 204. Step 204 may include presenting a prompt to the user that instructs the user to move device 10 in a particular fashion. For example, display 14 may present instructions to move device 10 in the desired manner (as shown in FIG. 15, for example), and/or another output device such as a speaker or a haptic output device may be used to instruct the user to move device 10. The movement may be slight or substantial and may include any combination of linear motion and rotational motion. If desired, instructions on display 14 may be combined with localized haptic output (e.g., a vibration on the right or left side of device 10 to help instruct the user to tilt or move device 10 to the right or left).

In arrangements where device 10 moves itself, operations may proceed from step 200 to step 206. At step 206, movement generation circuitry 28 may use actuators 60 to move device 10 in a particular manner (as shown in FIG. 14, for example). The movement may be slight or substantial and may include any combination of linear motion and rotational motion.

At step 208, motion sensor circuitry 32 may gather motion data as device 10 is moved. This may include gathering accelerometer measurements with one or more accelerometers, gyroscope measurements with one or more gyroscopes, compass information from one or more compasses, and/or other motion data from other motion sensors. Motion sensor data may be gathered in the time period between antenna measurements and/or may be gathered at the same time that antenna measurements are being made.

At step 210, antennas 48 of device 10 may receive additional signals from node 78. The position of one or more of antennas 48 in step 210 may be different than that of step 200. This provides additional baseline vectors for calculating angle of arrival. As shown in FIG. 13, for example, the different positions of antennas 48 as device 10 is moved from the position of step 200 to the position of step 210 provides control circuitry 22 with baseline vectors that span three-dimensional space.

If desired, additional antenna measurements and motion data may be gathered. For example, processing may loop back to step 200 after receiving antenna signals in step 210 (as indicated by line 214) and/or after processing a given set of antenna signals and motion data (as indicated by line 216) so that additional antenna measurements may be gathered while device 10 is in additional positions.

At step 212, control circuitry 22 may process antenna signals gathered in step 200 and 212 along with the motion data gathered in step 208 to determine the complete angle of arrival of signals 58 and thereby determine the position of node 78 relative to device 10. As discussed in connection with FIG. 9, the position of node 78 relative to device 10 may be defined relative to a reference plane and/or reference vector associated with device 10 (local horizon 162 and reference vector 164). Since device 10 is moving between different positions during angle of arrival measurement operations, the reference plane and reference vector associated with device 10 is also moving during angle of arrival measurement operations. If desired, the final angle of arrival determined in step 212 may be defined relative to a reference plane and reference vector associated with the original position of device 10 (e.g., the position of step 200), the most recent position of device 10 (e.g., the position of step 210), or some other position of device 10 (e.g., an average position of device 10, an intermediate position of device 10, etc.).

In one suitable arrangement, step 212 may include processing all of the motion data and the angle of arrival measurements taken in a given time frame together using a batch filter. This may produce a single angle of arrival vector (including an azimuth angle $\theta$ and an elevation angle $\varphi$) for that time frame. In another suitable arrangement, step 212 may include processing the motion data and the angle of arrival measurements sequentially (e.g., using an extended Kalman filter, a Gaussian mixture filter, or other suitable filter). The motion sensor data may be used to correlate one set of angle of arrival measurements with the next set of angle of arrival measurements, propagating the correct angle of arrival solution between the sequential measurements. These examples are merely illustrative, however. If desired, control circuitry 22 may use other methods such as least-squares estimation techniques, particle filtering techniques, unscented Kalman filtering techniques, Kalman smoothing techniques, other Kalman filtering techniques, linear regression techniques, or other suitable filtering techniques.

In an extended Kalman filter approach, a single angle of arrival is determined with each set of measurements at each different position of device 10, and is corrected as new measurements are taken at different positions. Since the elevation angle is initially unknown, the filter may be initialized with an arbitrary elevation angle such as zero degrees or other suitable angle. For example, in the first position of FIG. 11, the azimuth angle $\theta 1$ may be determined using the measured phase difference between signals received by antenna 48-1 and signals received by antenna 48-2. Since the elevation angle $\varphi 1$ is unknown, control circuitry 22 may select an arbitrary elevation angle such as zero degrees. With each subsequent set of measurements, control circuitry 22 may correct the elevation angle (and the azimuth angle, if necessary) until an accurate, complete angle of arrival is obtained.

In a Gaussian mixture filter approach, the filter may be initialized with "particles" (i.e., possible solutions) that have different elevation angles to cover all the possibilities of the initial angle of arrival ambiguity. The state vector for this implementation may be represented using azimuth angle $\theta$ and elevation angle $\varphi$. The infeasible particles with elevations that do not match the expected measurements are eliminated using the motion data, until a single, accurate angle of arrival measurement is determined.

If desired, step 212 may include consulting stored platform motion conditions to filter out inaccurate or improbable angle of arrival solutions. In particular, control circuitry 22 may impose certain assumptions in certain use cases. For example, if device 10 is in a fixed position (e.g., mounted to a wall or otherwise in a stationary position), control circuitry 22 may eliminate a range of elevation angles or may assume that the elevation angle is within a predetermined range. As another example, control circuitry 22 may impose an assumption that angles arriving from only one side of the antennas are valid. For example, signals arriving from nodes behind device 10 may be ignored, whereas signals arriving from in front of device 10 may be within the allowable range. In another suitable arrangement, device 10 may have multiple pairs of antennas 48, and control circuitry 22 may select which pair to use for angle of arrival measurements based on the region where node 78 is located relative to device 10.

Upon determining the angle of arrival of signals from node 78, device 10 may take suitable action. For example, control circuitry 22 may use display 14 to display information regarding the location of node 78 relative to device 10 (e.g., by displaying an icon on a location on display 14 that suggests node 78 is to the right or left of device 10, in front of device 10, or behind device 10). If the angle of arrival is within a given range of angles, control circuitry 22 may determine that device 10 is being intentionally pointed towards node 78, thus suggesting that the user would like to share information with node 78 (e.g., to send information to node 78 or receive information from node 78). In this type of scenario, control circuitry 22 may present an option to the user to share information with node, or control circuitry 22 may automatically share information with node 78. The user may confirm that he or she wishes to share information by providing input to device 10 (e.g., touch input on display 14, motion input detected by motion sensor circuitry 32, voice input detected by a microphone on device 10, or other suitable user input).

In some arrangements, device 10 may include more than two antennas 48 for measuring angle of arrival. For example, device 10 may include three, four, five, or more than five antennas 48 for receiving ultra-wideband signals, millimeter wave signals, or other signals from node 78. In this type of arrangement, there may be some scenarios where the angle of arrival measurement is unambiguous and motion sensor data is not necessary to determine the position of node 78 relative to device 10. In other scenarios, there may still be some ambiguity in the azimuth angle θ and/or the elevation angle φ. If desired, control circuitry 22 may gather a set of possible directions of arrival (e.g., multiple sets of azimuth and elevation angles) using the three or more antennas 48. Control circuitry 22 may assign a probability value to each possible angle of arrival (e.g., each azimuth and elevation angle pair). Control circuitry 22 may then select an angle of arrival based on its probability value. If desired, control circuitry 22 may resolve ambiguities in the angle of arrival using motion sensor data as discussed in connection with step 212 of FIG. 16.

The foregoing is merely illustrative and various modifications can be made to the described embodiments. The foregoing embodiments may be implemented individually or in any combination.

What is claimed is:

1. An electronic device, comprising:
    first and second antennas configured to receive signals from a second electronic device, wherein the signals include a first set of signals received while the electronic device is in a first position and a second set of signals received while the electronic device is in a second position;
    an actuator;
    control circuitry that sends control signals to the actuator to move the device from the first position to the second position after the first set of signals are received in the first position; and
    motion sensor circuitry that gathers motion data as the actuator moves the electronic device from the first position to the second position, wherein the control circuitry determines an angle of arrival of the signals based on the first set of signals, the second set of signals, and the motion data.

2. The electronic device defined in claim 1 wherein the motion sensor circuitry comprises at least one motion sensor selected from the group consisting of: an accelerometer, a gyroscope, a compass, and a barometer.

3. The electronic device defined in claim 1 wherein the first and second antennas are configured for IEEE 802.15.4 ultra-wideband signals.

4. The electronic device defined in claim 1 wherein the first and second antennas are configured for millimeter wave signals.

5. The electronic device defined in claim 1 further comprising a third antenna configured to receive the first and second sets of signals from the second electronic device while the electronic device is in the first and second positions.

6. The electronic device defined in claim 5 wherein the control circuitry determines multiple angle of arrival solutions using the first, second, and third antennas, assigns a probability to each angle of arrival solution, and determines the angle of arrival based on the probability of each angle of arrival solution.

7. The electronic device defined in claim 1 wherein the control circuitry determines a first phase difference associated with the first set of signals and a second phase difference associated with the second set of signals.

8. The electronic device defined in claim 7 wherein the control circuitry determines the angle of arrival based on the first and second phase differences.

9. The electronic device defined in claim 1 wherein the angle of arrival comprises an azimuth angle and an elevation angle.

10. The electronic device defined in claim 1 wherein the control circuitry determines the angle of arrival using a technique selected from the group consisting of: a batch filter, an extended Kalman filter, a Gaussian mixture filter, an unscented Kalman filter, a Kalman smoother, a particle filter, and a least-squares estimation.

11. A method for determining an angle of arrival of signals received by a first electronic device from a second electronic device, wherein the signals include first and second sets of signals and wherein the first electronic device comprises first and second antennas, motion sensor circuitry, an actuator, and control circuitry, the method comprising:
    while the first electronic device is in a first position, receiving the first set of signals with the first and second antennas;
    with the control circuitry, sending control signals to the actuator to move the first electronic device from the first position to a second position after the first set of signals are received in the first position;
    while the first electronic device is in the second position, receiving the second set of signals with the first and second antennas;
    with the motion sensor circuitry, gathering motion data as the actuator moves the first electronic device from the first position to the second position; and
    with the control circuitry, determining the angle of arrival of the signals based on the first set of signals, the second set of signals, and the motion data.

12. The method defined in claim 11 wherein the first electronic device comprises a third antenna, the method further comprising:
    receiving the first set of signals with the third antenna; and
    receiving the second set of signals with the third antenna.

13. The method defined in claim 11 wherein determining the angle of arrival comprises determining an azimuth angle and an elevation angle.

14. The method defined in claim 11 further comprising:
    determining a first phase difference associated with the first set of signals and a second phase difference associated with the second set of signals.

15. The method defined in claim 14 wherein determining the angle of arrival comprises determining the angle of arrival based on the first and second phase differences.

16. The method defined in claim 15 wherein determining the angle of arrival comprises determining the angle of arrival using a filter.

17. The method defined in claim 16 wherein the filter is selected from the group consisting of: a batch filter, an extended Kalman filter, a Gaussian mixture filter, an unscented Kalman filter, a Kalman smoother, a particle filter, and a least-squares estimation.

18. An electronic device, comprising:
    antennas that receive signals while the electronic device is in first and second positions;
    an actuator; and
    control circuitry that:

sends control signals to the actuator to move the electronic device from the first position to the second position after the signals are received in the first position; and determines an angle of arrival of the signals.

19. The electronic device defined in claim 18 further comprising motion sensor circuitry that gathers motion data as the electronic device moves from the first position to the second position.

20. The electronic device defined in claim 19 wherein the control circuitry determines the angle of arrival based on the motion data.

21. The electronic device defined in claim 18 wherein the antennas comprise first and second antennas configured to receive IEEE 802.15.4 ultra-wideband signals.

* * * * *